April 18, 1944. S. E. HEYMANN 2,346,966
HEATING APPARATUS
Filed Aug. 20, 1942
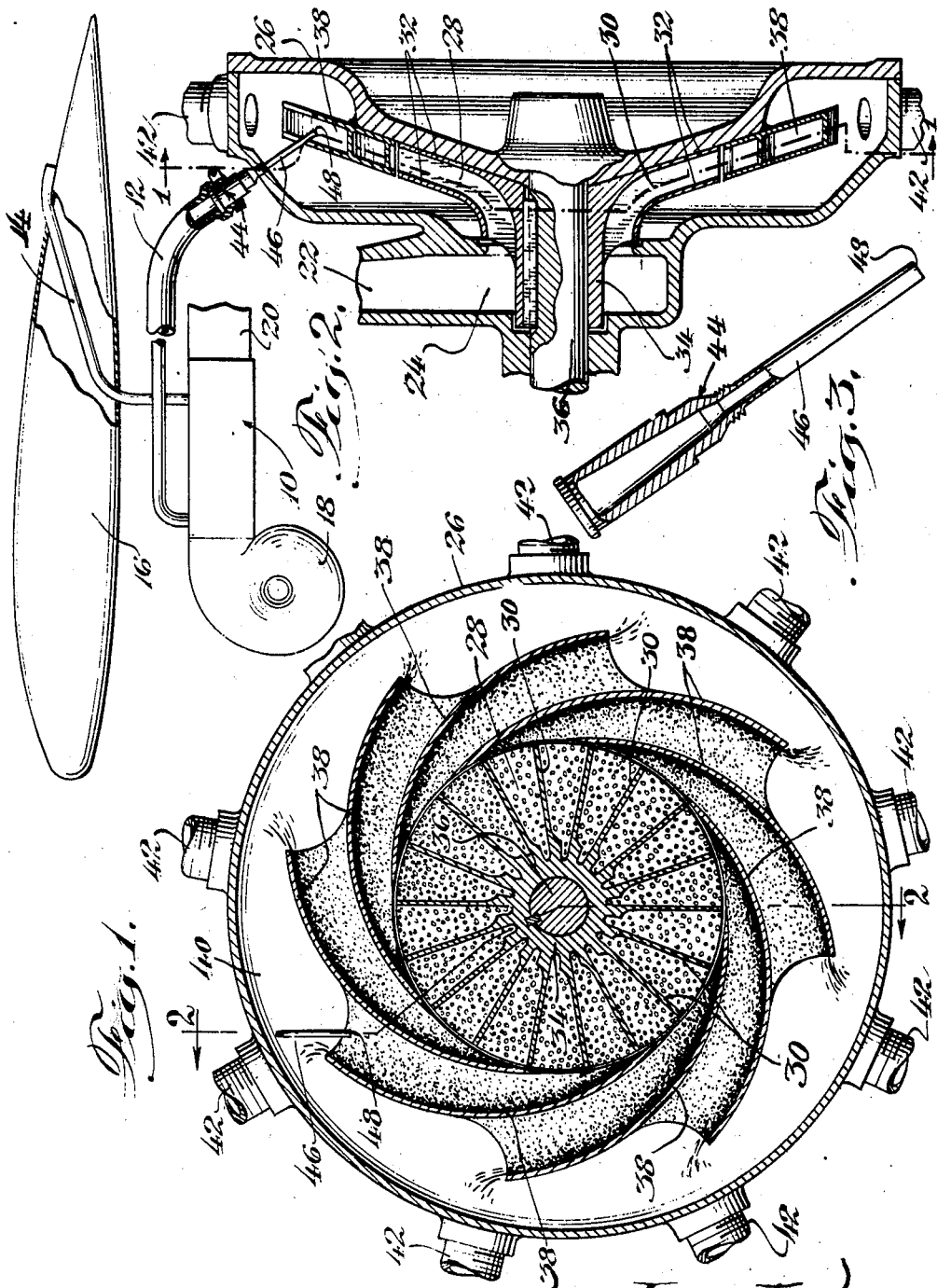

Patented Apr. 18, 1944

2,346,966

UNITED STATES PATENT OFFICE 2,346,966

HEATING APPARATUS

Seymour E. Heymann, Chicago, Ill., assignor to Stewart-Warner Corporation, Chicago, Ill., a corporation of Virginia Application August 20, 1942, Serial No. 455,518

5 Claims. (Cl. 183—77)

The present invention relates to heating apparatus, and more particularly to heating apparatus of the internal combustion type specifically adapted for use in heating the interiors of large airplanes or other vehicles where large heat output is desired from efficient equipment of comparatively low weight and small size.

A typical heater of this type is shown in the copending application of Henry J. DeN. McCollum, Serial No. 447,345, filed June 17, 1942, for "Heating apparatus."

Such a heater has an inlet opening adapted to be connected to a conduit leading to a source of combustible mixture, usually gasoline and air. This combustible mixture passes through the heating apparatus, where it is burned, and delivers its heat to a fresh air stream, the products of combustion passing outwardly of the airplane or other vehicle to a zone of lower pressure than the source of combustible mixture.

When such heaters are installed in airplanes having supercharged internal combustion engines, the source of combustible mixture frequently used is the supercharger casing, that is, a small portion of the combustible mixture passing through the supercharger is bypassed to the heater. The amount thus bypassed is too small appreciably to affect the operation of the engine with which the supercharger is associated.

Under cruising conditions, the combustible mixture removed from the supercharger casing is of approximately the proper degree of richness to give efficient heater operation. Under these conditions, the fuel is well vaporized and mixed with the air within the supercharger casing, and passes to the heater as a relatively dry mixture. It has been found, however, that under different operating conditions, particularly when the airplane engine is operating with a moderately rich or full rich mixture, these mixtures usually being used when the engines are operating under high power output conditions, the mixture thus produced is much too rich for efficient heater operation. In fact, under some conditions, the mixture is so extremely rich that combustion within the heater cannot be maintained.

One of the reasons why such extremely rich mixtures are used in an airplane engine during high power output conditions is that such high power output tends to cause engine overheating, and the excess gasoline vaporized and mixed with the air passing into the engine cylinders has a cooling effect which reduces the engine temperature. In other words, the mixture used when high engine power is desired is considerably richer than the most efficient mixture considered from the standpoint of combustion alone. It does, however, have the desired cooling effect, and this advantage offsets other disadvantages, so far as engine operation is concerned. As has been explained previously, however, it seriously affects heater operation.

The principal object of the present invention is to provide a novel arrangement for removing combustible mixture from a supercharger casing which operates to supply a heater connected thereto with a combustible mixture of suitable proportions, even though the combustible mixture issuing from the supercharger to the engine cylinders is considerably richer.

Another object of the present invention is to provide an improved internal combustion heater which is adapted to be connected to an airplane supercharger casing, and which further is adapted to remove a combustible mixture from the supercharger casing which is leaner than the mixture supplied to the engine cylinders when the engine associated with the supercharger is operating under high power output conditions.

Another object is to provide a novel arrangement for withdrawing a combustible mixture from an engine supercharger casing which gives a substantially constant ratio of fuel to air in the mixture, regardless of the degree of richness of the mixture supplied by the supercharger to the cylinders of the engine with which the supercharger is associated.

Other objects and advantages will become apparent from the following description of a preferred embodiment of my invention, illustrated in the accompanying drawing, in which:

Fig. 1 is a sectional view through a typical airplane engine supercharger showing apparatus of the present invention associated therewith. This view may be considered as taken in the direction of the arrows along the line 1—1 of Fig. 2.

Fig. 2 is a sectional view taken at substantially right angles to the view illustrated in Fig. 1. It may be considered as taken in the direction of the arrows along the lines 2—2 of Fig. 1. Fig. 2 also includes a diagrammatic showing of additional portions of the heating apparatus associated with the mechanism attached to the supercharger casing.

Fig. 3 is a longitudinal sectional view of a fitting forming a portion of the present invention.

In Fig. 2 of the drawing, I have shown diagrammatically, a typical internal combustion heater indicated generally by the numeral 10. This heater receives combustible mixture through a conduit 12, the mixture being burned in a combustion chamber, after which it is passed through a heat exchanger and then outwardly through an exhaust pipe 14 to a low pressure zone outside the aircraft. In this figure, the outlet of the exhaust pipe is shown as being located in a low pressure zone at the upper surface of an airplane wing 16. The air heated within the heating mechanism is impelled by a blower 18, this hot air passing into a hot air pipe 20, which may be connected to conduits leading to points where heat is desired, or the pipe 20 may be removed, in which case the hot air flows directly into the space where the heater is located.

The combustible mixture supplied to the conduit 12 originates in an airplane engine carburetor, not shown. This carburetor, however, is connected by a conduit 22 to an inlet passage 24 of an engine-driven supercharger. In general, the supercharger is comprised of an annular casing 26, within which is located an impeller 28.

The impeller 28 is comprised of a plurality of radially extending blades 30 secured between front and back plates 32, in such a manner that outwardly radiating passages are formed between the blades. At the central portion of the impeller, the blades and front and back plates are secured to, or formed integrally with, a hub 34 mounted upon an engine-driven shaft 36. Rotation of this shaft causes the combustible mixture to be drawn from the carburetor into the inlet passage 24, from where it is thrown outwardly by the blades 28 against a plurality of curved diffuser vanes 38. These diffuser vanes cause the combustible mixture to sweep outwardly in a helical manner into an annular space 40 formed within the supercharger casing.

At its edge, the casing has openings communicating with a plurality of conduits 42 leading to the intake ports of the several engine cylinders. The annular space 40 within the casing therefore acts as an engine intake manifold. Within this space the tendency of the combustible mixture issuing from the diffuser vanes 38, is to move in a circular manner in one direction. However, the combustible mixture periodically flowing through different ones of the several conduits 42 disrupts such circular flow, thereby causing great turbulence within this space, thus producing a homogeneous mixture of fuel and air.

As has been mentioned previously, the mixture thus produced under high power, full rich operating conditions, contains too high a ratio of fuel to air to be suitable for use in the heater 10. It will be appreciated further, that the ratio of fuel to air in the annular space 40 varies widely, depending upon whether the controls are set for maximum economy of engine operation, or whether they are set to the full rich condition, or to some intermediate position.

Under rich mixture operating conditions, the mixture from the carburetor passed to the inlet space 24, comprises air, a considerable quantity of vaporized fuel intimately mixed with the air, and a comparatively large quantity of unvaporized fuel. This heterogeneous mixture is passed outwardly by the supercharger impeller 28, and reaches the diffuser vanes 38 in substantially this same condition, although an additional portion of the liquid fuel is vaporized in the supercharger impeller passages.

When the mixture of air, vapor, and liquid fuel passes into the diffuser 38, its natural direction of movement is altered by the curved vanes; that is, instead of the mixture moving linearly, it is caused to move in a circumferential manner. The heavier portions of the mixture therefore are centrifuged against the outside vanes of the diffuser and form liquid films which flow outwardly and spill off the ends of these members. Adjacent this liquid film will be found a relatively rich mixture of fuel and air, while still farther from the film will be found a much leaner but relatively homogeneous mixture. The heterogeneous mixture sweeps outwardly through the diffuser and into the annular space 40, where the turbulence therein vaporizes the remaining liquid fuel and eventually forms a rich homogeneous mixture of the whole.

Inasmuch as the outer diffuser vanes are covered with liquid, whereas, the mixture spaced away from the outer vanes and toward the next adjacent inner vanes is lean and homogeneous, I provide a fitting 44 connected to the conduit 12, this fitting being threaded into the supercharger casing. Within the supercharger casing the fitting 44 has a comparatively long extension tube 46, which projects into a position beyond one of the outer diffuser vanes 38 with its open end, indicated by the numeral 48, located approximately midway between two of the diffuser vanes. The open end of this tube faces against the direction of flow through the diffuser passage. This arrangement permits the liquid fuel flowing along the surface of the adjacent outer diffuser vane to avoid the opening 48. Thus, the only substance finding its way into this opening is the homogeneous mixture of completely vaporized fuel and air that is spaced a considerable distance away from the liquid film.

Inasmuch as the tube 46 draws in only the lean component of the heterogeneous mixture, it will be appreciated that this portion contains a much lower ratio of fuel to air than does the mixture passing outwardly to the engine cylinders through the conduits 42. Under rich operating conditions, therefore, the heater receives a comparatively lean mixture which is suitable for its operation.

When the airplane engine is being operated economically at cruising throttle, the ratio of fuel to air passing into the inlet chamber 24 will be much less than is the case during rich operation. For this reason, a much larger proportion of the fuel will be vaporized. By the time this mixture is passed outwardy through the impeller 28 and the diffuser 38, it will be substantially completely vaporized. Therefore, the portion of the mixture flowing into the end 48 of the tube 46 will be more representative of the whole. Under these conditions, therefore, the mixture passed to the heater will be approximately the average mixture passing through the supercharger, rather than the leanest component of a heterogeneous rich mixture. At various stages between these two extremes, the portion of the fuel which emerges from the diffuser 38 in a liquid condition, will vary, but no matter what the conditions, the mixture which flows into the opening 48 of the tube 46 will be substantially always the same. Further, the combustible mixture as thus collected from the engine supercharger has been found to be admirably suited for use in an internal combustion heater.

While I have shown and described a particular embodiment of my invention, it will be apparent to those skilled in the art that numerous modifications and variations may be made without departing from the underlying principles of the invention. I therefore desire, by the following claims, to include within the scope of my invention all such modifications and variations by which substantially the results thereof may be obtained by the use of substantially the same or equivalent means.

I claim:

1. A means for deriving a substantially uniform mixture of liquid fuel and air from a passageway so shaped as to tend to throw the heavier components of a heterogeneous mixture of liquid fuel and air passing therethrough against one side thereof and within which passageway the ratio of vaporized fuel to liquid fuel may vary from time to time, comprising a fuel mixture take-off fitting extending into said passageway and having an opening facing against the direction of flow, said opening being spaced inwardly with respect to said one side sufficiently to lie within the zone where the fuel in the mixture is substantially completely vaporized regardless of the ratio of fuel to air in the mixture flowing through said passageway.

2. A means for supplying a combustible mixture to an internal combustion device from an engine supercharger having the following characteristics: an impeller member connected on its inlet side to a carbureting device so that the impeller member draws combustible mixture from the carbureting device and forces this mixture outwardly through a diffuser member having generally spirally extending vanes forming channels therebetween through which the combustible mixture passes to the interior of a blower casing; comprising a fitting to withdraw combustible mixture from the supercharger, said fitting extending through an opening in the supercharger wall in fluid-tight engagement therewith, said fitting having a tip provided with an inlet opening spaced inwardly from the supercharger wall, said opening being positioned within the confines of one of the passages formed between a pair of diffuser vanes and spaced inwardly from the surface of the outer of the two vanes.

3. A means for supplying a combustible mixture to an internal combustion device from an engine supercharger having the following characteristics: an impeller member connected on its inlet side to a carbureting device so that the impeller member draws combustible mixture from the carbureting device and forces this mixture outwardly through a diffuser member having generally spirally extending vanes forming channels therebetween through which the combustible mixture passes to the interior of a blower casing; comprising a fitting to withdraw combustible mixture from the supercharger, said fitting extending through an opening in the supercharger wall in fluid-tight engagement therewith, said fitting having a tip provided with an inlet opening spaced inwardly from the supercharger wall, said opening being positioned within the confines of one of the passages formed between a pair of diffuser vanes and spaced inwardly from the surface of the outer of the two vanes a distance appreciably greater than the maximum liquid film thickness ever present upon the last said surface.

4. A means for supplying a combustible mixture to an internal combustion heater from an engine supercharger having an impeller, which under some operating conditions may throw a heterogeneous mixture of fuel and air outwardly into a diffuser member having spiral blades which prevent a linear flow of the mixture therethrough and in which under different operating conditions the mixture passing through said diffuser member may vary in richness, comprising a take-off fitting projecting into the supercharger and having an opening facing against the direction of flow, said opening being located between adjacent diffuser vanes and spaced from the outer of said vanes sufficiently to avoid entrance thereinto of any unvaporized component passing through said diffuser.

5. A means for supplying a combustible mixture to an internal combustion heater from a carbureting system including a carbureting device, a passage connected to the outlet end of said carbureting device, and a means for producing a comparatively rapid flow of mixture from the carbureting device through the passage, comprising means in said passageway for changing the direction of flow of combustible mixture therethrough so as to centrifuge any unvaporized liquid component of said mixture against one wall of said passage, means forming a take-off opening located within the passage in a position spaced from the wall against which the liquid component is centrifuged a distance appreciably greater than the maximum liquid film thickness ever present upon the surface of said passage at the point opposite the take-off means, said take-off opening facing against the direction of flow of mixture through said passage, and means connecting the take-off opening to the internal combustion heater.

SEYMOUR E. HEYMANN.